United States Patent [19]

Lederman

[11] Patent Number: 4,838,398
[45] Date of Patent: Jun. 13, 1989

[54] METAL ROLLER CLUTCH CAGE

[75] Inventor: Frederick E. Lederman, Sandusky, Ohio

[73] Assignee: General Motors Corporation, Detroit, Mich.

[21] Appl. No.: 156,322

[22] Filed: Feb. 16, 1988

[51] Int. Cl.⁴ .............................................. F16D 15/00
[52] U.S. Cl. ..................................................... 192/45
[58] Field of Search .......................................... 192/45

[56] References Cited

U.S. PATENT DOCUMENTS

| | | | |
|---|---|---|---|
| 2,973,847 | 3/1961 | Stockton | 192/45 |
| 3,877,555 | 4/1975 | Rist | 192/45 |
| 4,106,602 | 8/1978 | Dieckermann | 192/45 |

Primary Examiner—Rodney H. Bonck
Attorney, Agent, or Firm—Patrick M. Griffin

[57] ABSTRACT

A metal roller clutch cage is formed from a pair of notched metal side rails and cross bars with rectangular tabs that fit through the notched cross bars. Some of the tabs are deformed to clasp the side rails to the cross bars, giving a rigid and secure composite structure. The thickness of the metal stock of the cross bars is related to the depth of the side rail notches in such a way as to assure that the parts of the cage that engage the outer and inner races are a pair of cut edges and a rolled on clad layer of the cross bars respectively. This assures that a minimal amount of expensive clad steel is used, and the total tolerance of that part of the cage that maintains the races coaxial or concentric may be held very closely.

2 Claims, 3 Drawing Sheets

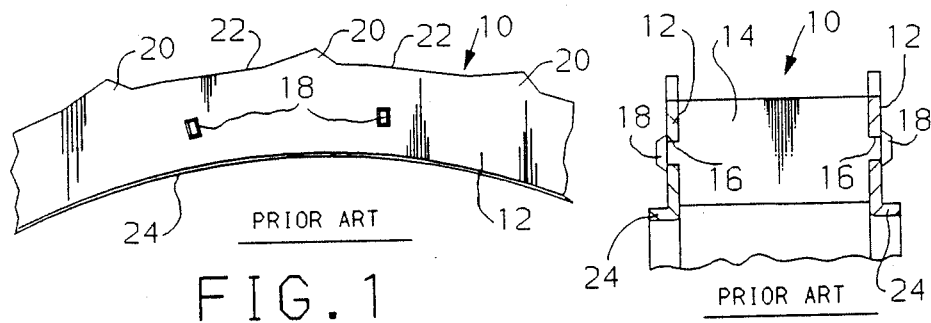
FIG. 1 PRIOR ART
FIG. 2 PRIOR ART
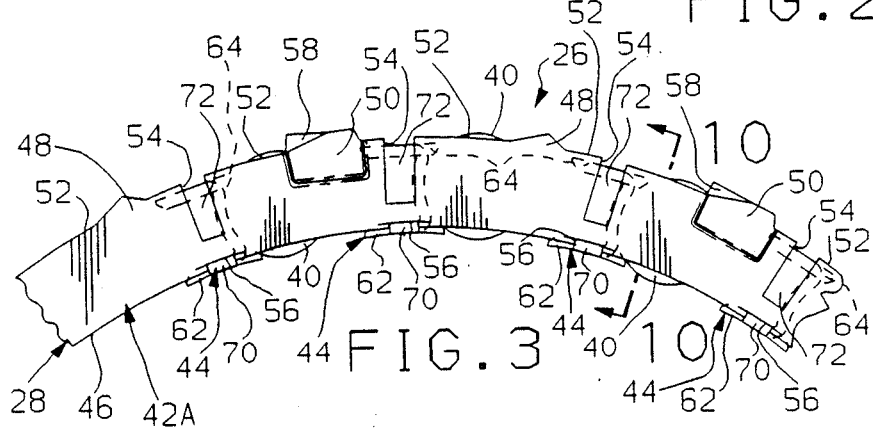
FIG. 3
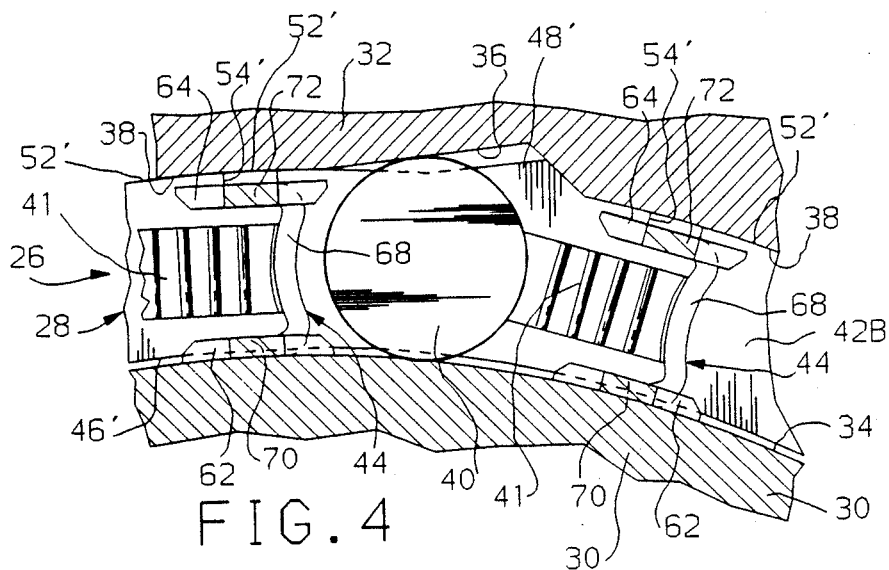
FIG. 4

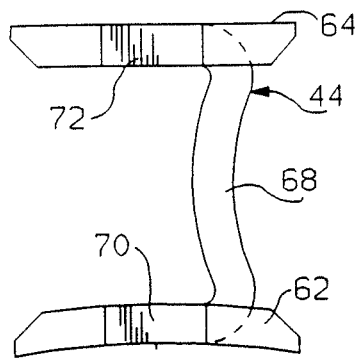
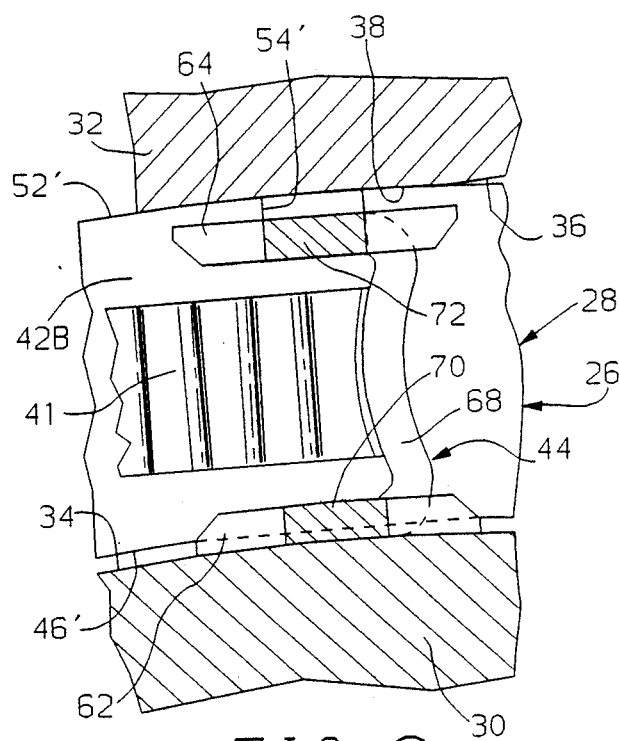
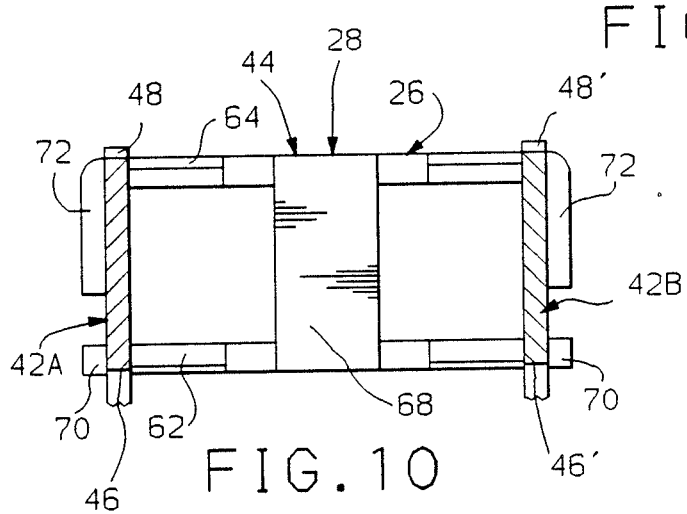

METAL ROLLER CLUTCH CAGE

BACKGROUND OF THE INVENTION

While roller clutch cages are increasingly being molded of plastic for cost and weight considerations, metal cages are still sometimes preferred. Metal cages are specified by clutch designers for use in high heat environments, and they do avoid the drawback of differential coefficients of thermal expansion that occurs when tight fitting, concentric control plastic cages are used between steel races. A typical conventional metal roller clutch cage is shown in FIGS. 1 and 2, and indicated generally at 10. Cage 10 consists of two annular side rails or end rings 12 and a plurality of circumferentially spaced metal cross bars 14. Tabs on cross bars 14 are received through small slots 16 in the end rings 12 and headed over at 18 to complete the cage structure. One structural limitation of cage 10 is that its rigidity is limited by the amount of area covered by the headed over cross bar portions 18. Rollers and springs, not illustrated, are then added to cage 10 to give a complete clutch unit that can be installed in one step between a pair of conventional clutch races.

In cage 10, the cross bars 14 provide mounts for the springs and rest surfaces for the rollers during shipping, but do not touch the confronting inner surfaces of both races and do nothing, therefore, to maintain the clutch races concentric or coaxial to one another. That function is served entirely by the end rings 12. The outer edges of the end rings 12 include circumferentially spaced reaction ears 20 that tie the cage 10 non turnably to the cam race, which, in this case, would be the outer race. Separating the reaction ears 20 are arcuate edge portions 22 which would abut cylindrical portions of the cam race when the cage 10 is installed. There is no relative rubbing, of course, between the cam race and the arcuate edge portions 22. The inner edges of the end rings 12 are bent over to form bearing flanges 24 which would conform closely to and pilot on the cylindrical pathway of the inner race. The abutment of the end ring arcuate edge portions 22 with the cam race and the piloting of the end ring flanges 24 on the pathway serve to keep the clutch races radially separated and in substantially coaxial relation. Radial loads between the races are well supported, since the end rings 12 are very strong in radial compression. This design presents a couple of drawbacks in terms of manufacturing and cost, however.

Since the outer surface of the flanges 24 will be piloting on the pathway of the inner race at very high speeds during clutch overrun, and will be subject, therefore, to a great deal of potential rubbing wear, it is practically necessary to clad flanges 24 with a metal layer, such as aluminum, that will cooperate with the lubricant better than the base steel. Therefore, the end rings 12 are stamped from a clad steel material, which is relatively quite costly. As a consequence, the entire inner surface of the end rings 12 is clad as well, unnecessarily, just to obtain the needed cladding of the flanges 24. Another drawback is that the tolerance or accuracy with which the races will be maintained in coaxial relation is necessarily limited by the accuracy with which the radial separation between end ring arcuate edges 22 and the outer surface of the flanges 24, best seen in FIG. 2, can be maintained. The arcuate edges 22 are produced by a cutting operation, which is quite accurate, with a tolerance of approximately 0.001 inches, plus or minus. The flanges 24, however, are produced in a bending operation, which is not as accurate as cutting, with a tolerance of approximately 0.0035 inches. Therefore, there is a total tolerance stack up of perhaps 0.0045 inches. While this is by no means an unworkable tolerance, it would be desirable, if possible, to reduce it, doubly so if that reduction could be had in a structure that provided equal or better rigidity and ease of manufacture. Even more desirable would be a reduction in the amount of clad steel material used, with a consequent significant reduction in cost.

SUMMARY OF THE INVENTION

The invention provides an all metal clutch cage which provides all the desirable improvements noted above. The preferred embodiment of the roller clutch is disclosed for use between an outer race having a conventional series of cam ramps separated by cylindrical portions, and an inner race having a cylindrical pathway. The clutch cage includes a pair of generally annular steel end rings or side rails that are held in rigid axially spaced relation by a plurality of circumferentially spaced cross bars. Each side rail is stamped entirely of unclad steel. The inner edge of each side rail is a circular cut edge, while the outer edges are comprised of a series of conventional circumferentially spaced reaction ears separated by arcuate edge portions. The radial width of the rails is sufficient such that, if the races are held coaxial to one another, the side rails will fit between the clutch races with the inner edges radially spaced from the pathway by a predetermined small differential and with the outer arcuate edge portions abutted with the cylindrical portions of the outer race. In addition, each side rail inner edge has a series of circumferentially spaced rectangular notches of a first predetermined depth cut therein, while the outer edges have a series of circumferentially spaced rectangular notches of a second and greater predetermined depth cut therein, each radially opposed to a respective notch in the inner side rail edge.

Each cross bar is folded from a blank of flat, clad steel stock. Only the cross bars are formed of clad steel, and the amount of stock needed for the cross bar blanks is significantly less, and therefore significantly less expensive, than the clad side rails of the prior art cage described above. The clad stock has a rolled thickness that is less than the second predetermined depth, but greater than the first predetermined depth by essentially the same predetermined differential described above. After folding, but before assembly to the side rails, each cross bar has a rectangular upper wall and a radially opposed, rectangular lower wall joined by a radially extending web. The side edges of both the upper and lower walls and of the web are abutted with the inside surfaces of the side rails. While the upper wall is essentially flat, the lower wall is stamped with an an arcuate outside surface conformable to the pathway of the inner race. Extending straight out from the side edges of each cross bar upper wall are a pair of tabs sized to fit closely within the notches of each side rail outer edge. And, extending straight out from the side edges of each cross bar lower wall are a pair of tabs sized to fit closely within the notches of each side rail inner edge.

The cage is assembled by interfitting the respective cross bar tabs and side rail notches and then folding the upper tabs down over the outside of the side rails to clasp the side rails in abutment with the cross bar side edges. This creates a very rigid structure, as the folded down tabs provide much more area acting to retain the side rails together than do the much smaller rivet heads of the prior art cage noted above. When the cage is assembled between the races, the arcuate portions of the side rail outer edges abut the cylindrical portions of the outer race. Because the cross bar stock is thicker than the depth of the notches in the side rail inner edges, and because of the defined width of the side rails, the side rail inner edges are held clear of the pathway, while only the bottom surfaces of the cross bar lower walls ride on the pathway. Loads between the races are transferred through the composite structure of side rail and cross bar lower wall, which is essentially as strong, in compression, as the side rails alone of the prior art cage described above. The same composite structure serves to maintain the races in substantially coaxial relation. The total tolerance of this composite side rail-cross bar lower wall structure consists of the sum of the tolerances of two cutting operations, cutting the side rail second edge and cutting the notch in the side rail first edge, plus the tolerance involved in rolling the final thickness of the clad stock of the cross bar lower wall. This total tolerance can be held much more closely than can the bending operation that forms the flanges of the prior art cage described above, so the races can be maintained in even closer coaxial relation. In conclusion, the cage of the invention is an improvement in terms of cost, strength and accuracy.

It is, therefore, a general object of the invention to provide a metal roller clutch cage in which the total amount of costly clad metal in the cage is reduced to a minimum.

It is another therefore, an object of the invention to provide a metal roller clutch cage of superior rigidity including notched metal side rails that fit between a pair of clutch races and cross bars folded from flat metal stock with axially extending tabs that fit closely within the side rail notches, with at least some of the tabs being deformable over the outside of the side rails to clasp the side rails into tight abutment with the edges of the cross bars.

It is another object of the invention to provide such a metal cage of superior rigidity in which the thickness of the flat stock from which the cross bars are folded and the depth of the notches within which the cross bar tabs are fitted are related in such a way that loads between the clutch races are transferred from one cut edge of the side rail to the cut bottom edge of a notch in the other side rail edge and then through the lower wall of the cross bar, giving a tighter total tolerance that allows the races to be maintained in more accurate coaxial relation.

DESCRIPTION OF THE PREFERRED EMBODIMENT

These and other objects and features of the invention will appear from the following written description, and from the drawings, in which:

FIGS. 1 and 2 show the prior art cage described above;

FIG. 3 shows a portion of the roller clutch cage of the invention prior to installation between a pair of clutch races;

FIG. 4 shows a portion of the cage after installation, with one side rail broken away;

FIG. 8 shows a side view of the cross bar of FIG. 7;

FIG. 9 shows an enlargement of a portion of FIG. 4;

FIG. 10 shows a cross section of the cage taken along the line 10—10 of FIG. 3.

Figure 5:
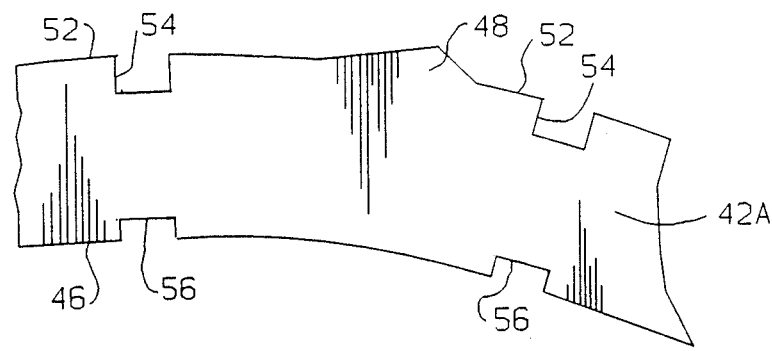
FIG. 5 shows a portion of one side rail alone.

Referring first to FIGS. 3 and 4, a roller clutch 26 is shown incorporating the preferred embodiment of the metal cage of the invention, designated generally at 28. Cage 28 is designed to be installed between a pair of conventional coaxially disposed clutch races, including an inner race 30 and outer race 32. Inner race 30 has a continuous cylindrical outer surface or pathway 34 defined about the race coaxis which confronts the inner surface of outer race 32. The inner surface of outer race 32 is more complex, consisting of a series of sixteen evenly circumferentially spaced sloped cam ramps 36 separated by an equal number of cylindrical surface portions 38. Outer race 32 also includes a pair of parallel grooves 39 cut into its inner surface, for a purpose described below. Only a few cam ramps 36 are shown in FIG. 4, but this is sufficient, as the races 30 and 32 repeat all the way round. Cage 28, together with sixteen conventional rollers 40 and roller energizing springs 41, make up the clutch 26, which is installed with the conventional axial pushing and counterclockwise twisting motion between the races 30 and 32 that is generally known as "ringing in" the clutch. More detail about the installation of clutch 26 will be described below.

Referring next to FIGS. 3, 5 and 8, cage 28 consists of a pair of side rails, designated generally at 42A and 42B. Side rail 42A is shown in FIG. 5, while side rail 42B shows in other views where side rail 42A is broken away, but it should be understood that the two are substantially identical, but for one feature noted below. The side rails 42A and 42B are maintained in axially separated, parallel relation by sixteen evenly circumferentially spaced cross bars, designated generally at 44. Each side rail 42A and 42B is generally annular in shape, and is stamped of ordinary, non clad steel. The stamping operation leaves a cut inner edge 46 that is circular. The outer edge of side rail 42 is more complex, consisting of a series of eight conventional sloped reaction ears 48, one for every other cam ramp 36, which alternate with eight sloped locking ears 50. The reaction ears 48 are flat to the side rail 42A, while the sloped locking ears 50 are stamped with an axially outward bulge, for a purpose described below. The reaction ears 48 and locking ears 50 are separated by sixteen arcuate edge portions 52. Cut into each arcuate edge portion 52 is a rectangular notch 54. Directly opposite each notch 54, cut into inner edge 46, is another rectangular notch 56, which is of equal width, but less depth, than notch 54. The depth of notch 56 is slightly less than, and the depth of notch 54 is slightly greater than, the thickness of the stock from which cross bar 44 is formed, for a reason described below. The radial width of each side rail 42A, as measured from inner edge 46 to each arcuate outer edge portion 52, is slightly greater than the radial separation that would exist between the inner race pathway 34 and the outer race cylindrical portions 38 if the races 30 and 32 were to be somehow held in absolutely coaxial relation. The side rail 42B is identical to 42A, but for its eight locking ears, part of which are visible in FIG. 3 at 58, and which are not sloped like locking ears 50, for a reason described below. The remaining edges of and notches cut into side rail 42B are not visible in FIG. 3, since they lie right on top of the corresponding structure of side rails 42A, but are indicated by the same number with a prime, where visible. However, it will be understood that the notches 54 and 56 in side rail 42A form aligned pairs with identical notches in side rail 42B, when the side rails 42A and 42B are aligned. The various edges and notches of the side rails 42A and 42B, being cut edges, may be practically held to a manufacturing tolerance of approximately 0.001 inch.

Figure 6:
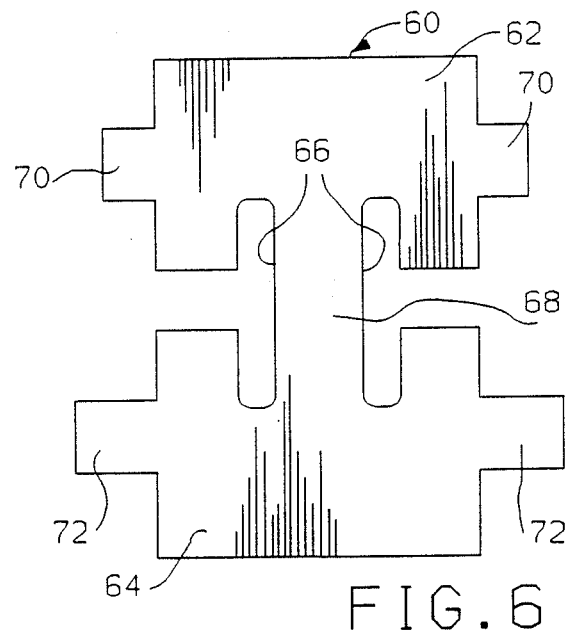
FIG. 6 show the blank from which the cross bar is folded.
Figure 7:
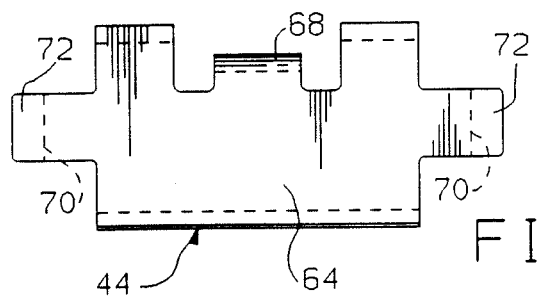
FIG. 7 shows an end view of the cross bar after folding, but before its assembly to the cage.

Referring next to FIGS. 6, 7, and 8, each cross bar 44 is folded from a blank of flat steel stock, indicated at 60, which has a cladding layer of aluminum or other suitable lubricant coactive material on one side. The cladding layer is rolled onto the steel substrate with great pressure, and its rolled thickness may be held with a very accurate tolerance of approximately, 0.0002 inches. This great accuracy is taken advantage of in a manner more fully described below. It will be understood that the side rails 12 of the prior art cage above have to be stamped from a larger round blank, which leaves an inner circle and an outer ring that are scrapped, all for the purpose of obtaining cladding on just the relatively narrow band of cladding on the undersurface of the L flanges 24. The basically rectangular blanks 60 make much more efficient use of the relatively costly clad steel material. Blank 60 includes a generally rectangular wall 62 and 64 of equal width, separated by a pair of T-shaped slots 66 to leave a web 68. Wall 62 has a pair of rectangular tabs 70 extending axially out from its side edges. Wall 64 also has a pair of rectangular tabs 72 extending axially out from its side edges which are longer than tabs 70, but of equal width, which width is also generally equal to the width of notches 54 and 56. After folding, as best seen in FIGS. 8 and 9, cross bar 44 has a generally C or U shaped cross section, with wall 62 disposed below and wall 64 disposed above and radially opposite to wall 62. Web 66 is long enough that it is bowed slightly, as best seen in FIG. 8. While upper wall 64 is flat, lower wall 62 is stamped with an outside surface so that its clad lower surface can conform to the inner race pathway 34. The tabs 70 and 72 are directly axially aligned and radially opposed.

Referring next to FIGS. 9 and 10, once the cross bar blanks 60, of which there would be a total of 16, have been folded, cage 28 is completed as follows. Each cross bar 44 is disposed between the side rails 42A and 42B such that the locking ears 50 and 58 are aligned and with the tabs 70 and 72 fitted closely through the side rail notches 56 and 5 respectively. This serves to align and mutually register all components of cage 28. As best seen in FIG. 9, the tabs 72 rest in notches 54 deeply enough that upper wall 64 rests slightly below the side rail arcuate edge portions 52 and 52′. Conversely, the tabs 70 rest in notches 56 shallow enough that the outer surface of lower wall 62 is disposed lower than the side rail inner edges 46. Then, the longer tabs 72 are bent straight down and firmly against the outside of the side rails 42A and 42B, as best seen in FIG. 10, which serves to draw the inside surfaces of the side rails 42A and 42B tightly against the side edges of the cross bar rectangular walls 62 and 64. The amount of surface area in mutual contact between the bent down tabs 72 and the outside of the side rails 42A and 42B is much greater than a conventional headed rivet, and serves to keep the side rails 42A and 42B very rigidly axially spaced and parallel. The composite structure formed by the cross bars 44 with the side rails 42A and 42B is, in effect, a trussed box. The total tolerance involved in this composite structure of cross bar 44 and side rails 42A and 42B is that which exists moving from the highest point, the arcuate edge portions 52, to the lowest point, the undersurface of lower wall 62. This total tolerance, then, consists of the individual manufacturing tolerances involved in cutting the side rail arcuate edge portions 52 (or 52′), in cutting the notches 56 (or 56′), and in rolling the clad undersurface of the cross bar lower wall 62, for a total of perhaps 22 thousandths of an inch. This may be compared to the total tolerance involved in the conventional side rail 12 described above, of approximately 45 thousandths of an inch. The conventional side rail 12 is a unitary structure, but has a tolerance about twice as wide as the composite structure here, because of the high tolerance involved in bending the L shaped flange 24. Since the composite structure of cross bar 44 and side rails 42A and 42B acts as a bearing or journal block to keep the races 30 and 32 coaxial, the tight tolerance gives greater concentricity control, as will be described next.

Referring next to FIGS. 4 and 9, clutch 26 is assembled by adding rollers 40 and springs 41 to cage 28 in conventional fashion. Clutch 26 is then installed between the races 30 and 32 by first aligning cage 28 with outer race 32 so that the reaction ears 48 and 48′ and the sloped locking ears 50 will miss the cam ramps 32. Next, cage 28 is pushed side rail 42A first axially into the outer race 32, until the locking ears 50 and 58 reach their proper axial position. Then cage 28 is twisted until the reaction ears 48 and 48′ rest against the cam ramps 36, at which point clutch 26 is non-turnably tied to outer race 32, with the side rail arcuate edges 52 and 52′ directly abutted with the outer race cylindrical portions 38. Because of the greater depth of the notches 54 and 54′, the cross bar upper walls 64 are clear of the outer race cylindrical portions 38. Then, inner race 30 is added by the well known twisting or "ringing in" method. Because of the width of side rails 42A and 42B relative to the nominal radial spacing between the races 30 and 32 described above, after inner race 30 is added, the inner race pathway 34 pilots on the clad lower layer of cross bar lower wall 62, while the inner side rail edges 46 and 46′ remain clear of the pathway 34. Thus, the races 30 and 32 are spaced apart by, and transfer loads through both the side rails 42A and 42B and the cross bars 44. That composite structure, as already noted, is more rigid and secure than a conventional riveted cage, and is as strong in compression as the single piece side rail 12, for the same reason that a stack of pennies is generally as strong in compression as is a solid copper bar of equal diameter. The accuracy with which the races 30 and 32 are maintained in coaxial relation of course, the total tolerance described in detail above, which, as noted, is improved over a conventional cage like cage 10. With improved race concentricity comes less running eccentricity, with consequently less roller travel and spring compression and expansion, which improves clutch operation. Thus, all areas of structural strength and rigidity, material cost, manufacturing tolerance, race concentricity and clutch operation are improved by the way in which the cross bars 44 and the side rails 42A and 42B interfit and structurally cooperate.

Variations of the preferred embodiment of the clutch cage 28 may be made. The ends of the tabs 70 could be flush with the outside of the side rails 42A and 42B, and need not extend axially out beyond them. The fact that they do so makes for easier handling during manufacture, and could, in a different environment, also help to protect the bent down upper tabs 72 from bumping by adjacent structures. Different locking ears 50 and 58 could be used with different outer races. The cross bar web 68 could be shorter, but makes the blank 60 easier to cut, because of the consequent wider separation between the walls 62 and 64. Therefore, it will be understood that the invention is not intended to be limited to just the preferred embodiment disclosed.

The embodiments of the invention in which an exclusive property of privilege is claimed are defined as follows:

1. A metal roller clutch cage for use between a pair of metal clutch races, comprising:

a pair of generally annular metal side rails, each having a first and second edge, sized so as to fit between said races when said races are located substantially coaxial to one another, with said first and second edges of said side rails further including a series of pairs of radially opposed and circumferentially spaced rectangular notches therein, a plurality of cross bars folded from flat metal stock with a thickness that is substantially equal to the depth of said notches with each of said cross bars having first and second generally rectangular, radially opposed walls joined by a radially extending web, with the side edges of said walls being abutable with the inside of said side rails, said first wall further having an arcuate outside surface conformable to said pathway and a pair of axially extending tabs sized so as to fit closely within said side rail first edge notches, said second wall further having a pair of axially extending tabs sized so as to fit within said side rail second edge notches.

whereby, said cage may be assembled by interfitting said respective cross bar tabs and side rail notches and then deforming said cross bar second wall tabs down over the outside of said side rails, thereby drawing said side rails into abutment with said cross bar side edges and retaining said side rails together in rigid, axially spaced relation.

2. A metal roller clutch cage for use between a pair of metal clutch races of which one race has a cylindrical pathway and the other race has a surface confronting said pathway that includes a circumferentially spaced series of cylindrical portions, said cage comprising;

a pair of generally annular metal side rails sized so as to fit between said races when said races are located substantially coaxial to one another with a first side rail edge radially spaced from said pathway by a predetermined differential and a second, cut side rail edge abutted with said other race cylindrical portions, said first edge of each side rail further including a series of circumferentially spaced rectangular notches of a first predetermined depth cut therein and said second edge of each side rail further including a radially opposed series of circumferentially spaced rectangular notches of a second, greater predetermined depth cut therein, a plurality of cross bars folded from flat, metal stock with a thickness that is less than said second predetermined depth and which is also greater than said first predetermined depth by substantially said predetermined differential, with each of said cross bars having first and second generally rectangular, radially opposed walls joined by a radially extending web, with the side edges of said walls being abutable with the inside of said side rails, said first wall further having an arcuate outside surface conformable to said pathway and a pair of axially extending tabs sized so as to fit closely within said side rail first edge notches, said second wall further having a pair of axially extending tabs sized so as to fit within said side rail second edge notches, whereby, said cage may be assembled by interfitting said respective cross bar tabs and side rail notches and then deforming said cross bar second wall tabs down over the outside of said side rails, thereby drawing said side rails into abutment with said cross bar side edges and retaining said side rails together in rigid, axially spaced relation, with said cage thereafter fitting between said clutch races with the outer surfaces of said cross bar first walls resting on said pathway and with said side rail first edges clear of said pathway and with said side rail second edges abutted with said other race cylindrical portions, thereby maintaining said clutch races in substantially coaxial relation with a total tolerance consisting of the sum of the manufacturing tolerances involved in cutting said side rail second edges and cutting said first edge rectangular notches, plus the manufacturing tolerance involved in forming the thickness of said flat metal cross bar stock.

* * * * *